Patented July 31, 1945

2,380,563

UNITED STATES PATENT OFFICE 2,380,563

PROCESS FOR THE PREPARATION OF CAPRYL SALICYLATE

Stephen J. Wayo, Whiting, Ind., and Franklin M. Watkins, Chicago, Ill., assignors to Sinclair Refining Company, New York, N. Y., a corporation of Maine No Drawing. Application May 13, 1942, Serial No. 442,864

6 Claims. (Cl. 260—474)

This invention relates to an improved method of preparing the secondary octyl ester of salicylic acid known as "capryl salicylate." It relates more particularly to an improved process involving the reacting of capryl alcohol (secondary octyl alcohol) with methyl salicylate in the presence of a catalyst. The ultimate results of the reaction may be graphically represented as follows:

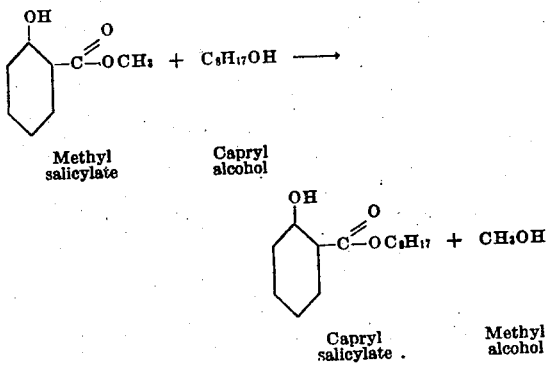

Reactions such as represented above are generally designated "alcohol exchange" or "alcoholysis" and will be so designated herein.

The present invention constitutes an improvement in the process described and claimed in co-pending application Serial No. 421,372, filed December 2, 1941, in the name of Robert H. Gardner and Franklin M. Watkins, one of the joint inventors of the present application, said process similarly involving alcoholysis between a primary alcohol ester of salicylic acid and a secondary alcohol in the presence of a catalyst.

Alcoholysis, whereby one primary alcohol radical is substituted for another, is a recognized procedure in organic chemistry. However, the limitations of its use have been fully recognized. For example, the tendency of a secondary alcohol to replace a primary alcohol by alcoholysis has, prior to the invention described in said pending application, been found to be negligible or else so slight as to be of no practical commercial significance.

According to the process of said pending application, the secondary alcohol is reacted with the primary alcohol ester of salicylic acid in the presence of the catalyst under conditions of temperature and pressure such that the primary alcohol formed by the reaction is distilled off from the zone of reaction substantially as rapidly as formed.

One of the catalysts found to be particularly useful in the process as previously employed is metallic sodium. As is well recognized, the use of metallic sodium, particularly in a moist environment, constitutes a fire and explosion hazard. It is an object of the present invention so to modify and improve the process as to avoid the use of metallic sodium or other hazardous materials in environments apt to result in fire or explosions.

We have discovered that, under carefully controlled conditions, the alcoholysis reaction between methyl salicylate and capryl alcohol, resulting in the production of capryl salicylate, may be effected by the use of sodium hydroxide as the catalyst. Under conditions hereinafter fully described, we have found the use of sodium hydroxide catalyst to result in the conversion of the methyl salicylate to capryl salicylate with yields closely approximating the theoretical yields, of high purity and with only minor losses of methyl salicylate and capryl alcohol.

The use of sodium hydroxide as the catalyst for this alcoholysis reaction presents certain difficulties which, if special precautions are not taken, result in economic, if not complete, impracticability of the process for the production of capryl salicylate. If an aqueous solution of sodium hydroxide be added to a hot solution of methyl salicylate and capryl alcohol, the methyl salicylate is saponified by the sodium hydroxide which is thereby quantitatively converted to sodium salicylate. Even when sodium hydroxide is added as a methyl alcohol solution to a mixture of methyl salicylate and capryl alcohol at a relatively low temperature, at least partial saponification occurs. The sodium salicylate formed is not an active catalyst. The saponification depletes the active NaOH catalyst and further uses up valuable methyl salicylate. In accordance with our improved process, saponification of the methyl salicylate is substantially prevented.

In accordance with our improved process, the sodium hydroxide catalyst is with advantage added as an alcoholic solution. Methyl and ethyl alcohols have been found suitable for this purpose.

It is generally recognized that sodium hydroxide reacts with such alcohols to a greater or less extent to form the corresponding alcoholate and water. This reaction may proceed in a methyl or ethyl alcohol solution to an extent as great as 75% to 100%.

Reference herein and in the appended claims to alcoholic sodium hydroxide solutions will be understood to include such reaction products as may be formed therein. Also reference herein to the sodium hydroxide catalyst is intended to include such alcoholic solution of sodium hydroxide.

Briefly, our improved process comprises the reacting of the capryl alcohol with methyl salicylate in the presence of sodium hydroxide catalyst under conditions of temperature and pressure which promote the desired reaction without substantial dehydration of the secondary alcohol or substantial saponification of the methyl salicylate and such that the methyl alcohol formed by the reaction is removed by distillation from the zone of reaction substantially as rapidly as formed.

We have discovered that saponification of the methyl salicylate may be prevented or materially retarded by maintaining conditions within the reaction zone such that any water present in the reacting materials is expelled prior to the introduction of the sodium hydroxide catalyst, any water introduced with the catalyst is instantly expelled, and any water formed during the reaction is eliminated from the reaction zone substantially as rapidly as formed.

In accordance with the present invention, this is effected by heating the mixture of alcohol and ester to a temperature well above the boiling point of water, advantageously to 275° F. or higher, prior to the addition of the sodium hydroxide catalyst and maintaining in the reacting zone a temperature of that order throughout the reaction. The rapid elimination of water may be further aided by the addition of a volatile inert carrier such as low boiling naphtha, toluene or the like, which is rapidly vaporized under the operating conditions and which assists in the vaporization and removal of water by well known partial pressure effects. The use of volatile inert carriers also aids in the rapid elimination of the methyl alcohol. While the use of inert volatile carriers is not essential to the operation of the process of the present invention, it is sometimes desirable for the purposes stated.

It is an essential of our improved process, as previously noted, that no substantial amount of water be present in the reaction zone when the catalyst is added. This anhydrous condition may be accomplished by the use of anhydrous reacting materials or by dehydrating the methyl salicylate and capryl alcohol mixture in the reaction zone prior to the addition of the catalyst. In effecting the dehydration of the mixture an inert carrier, such as previously mentioned, may be used with advantage.

Though the introduction of the catalyst in alcoholic solution has been found particularly advantageous, solid NaOH may if desired be charged to the reaction zone, preferably in a substantially anhydrous form.

However, the use of solid anhydrous NaOH does not eliminate the necessity of precaution with respect to the presence of moisture, as there appears to be some formation of water by intermediate or side reactions. Whatever the source of water, it must be instantly expelled if saponification of the methyl salicylate is to be prevented.

After the alcoholysis reaction has been completed, which is indicated by the cessation of the methyl alcohol distillation, the capryl salicylate product is separated from the catalyst and any unreacted capryl alcohol or methyl salicylate, as hereinafter more fully described.

The invention has been found particularly valuable for the safe and economical preparation of capryl salicylate used in the preparation of addends for lubricating oils for which application for Letters Patent Serial No. 409,856 was filed September 6, 1941, by William L. Finley.

The process of the present invention will be illustrated by the following specific examples:

To a 5 liter flask there was charged 1560 grams of "CP3°" capryl alcohol and 912 grams of U. S. P. methyl salicylate. The capryl alcohol contained 16 grams of water equivalent to 1% by weight, 119 grams of capryl ketone equivalent to 7.7% by weight and 1425 grams of capryl alcohol equivalent to 91.3% by weight. The molar ratio of capryl alcohol and methyl salicylate added to the flask was 1.85:1.

The mixture in the flask was then heated to a temperature of 275° F. and, after any water present had been expelled, 72 grams of methyl alcohol-sodium hydroxide solution was introduced through a separatory funnel, the time required for the addition being 5 minutes.

The alcoholic-sodium hydroxide solution contained 12 grams or 16.6% by weight of sodium hydroxide and the molar ratio of the sodium hydroxide catalyst thus added to the methyl salicylate was 0.05:1. This total charge was 2544 grams.

The heating of the flask was continued and methanol was distilled off. In about 1 hour, a temperature of 350° was reached and this temperature was maintained for about 3 hours at which time methanol practically ceased to be distilled off. The amount of crude methanol thus distilled from the flask was 306 grams and analysis showed it to consist by volume of 17.5% capryl alcohol, 5.4% water and 77.1% methanol.

After allowing for the methanol added as alcoholic-sodium hydroxide solution, the crude methanol yield from the esterification reaction was found to be 57.5% by volume which indicates that 92.2% by weight of the methyl salicylate was converted to capryl salicylate. The weight of crude capryl salicylate remaining in the flask as bottoms was 2223 grams. The reaction loss was equal to only 0.6% by weight.

A 2133 gram portion of the crude ester bottoms was washed once with 500 c. c. of dilute (1:4) hydrochloric acid to convert any sodium phenate present to free ester and was then washed with water until neutral. The loss by washing was 15 grams or 0.7% by weight.

A 1742 gram portion of the washed ester was then charged to a 5 liter flask fitted with a steam delivery tube extending well below the surface of the liquid. The flask was then heated and, when the liquid temperature had reached 230° F., steam was introduced through the delivery tube. After a period of 45 minutes of this steam distillation and external heating, the temperature of the liquid within the flask was 300° F. It was held at this temperature for 2½ hours until tests indicated that all unreacted capryl alcohol and methyl salicylate had been distilled off. The overhead product totalled 857 grams or 49.2% by weight of the charge to the steam distillation and the amount of bottoms remaining in the flask was 879 grams or 50.4% by weight, indicating a total distillation loss of 6 grams or 0.4% by weight.

The distillation bottoms was substantially pure capryl salicylate, having an acid number of 0.8 and a saponification number of 223.1 as against a theoretical saponification number of 224, indicating the composition to be 99.8% by weight of capryl salicylate and 0.2% by weight of salicylic acid.

The overhead from this steam distillation, as previously indicated, contained unreacted capryl alcohol and methyl salicylate and also 228 grams of capryl salicylate, as well as 2.1% by weight of water and 10.2% by weight of ketone. Its acid number was 2.3, its saponification number 55.5 and its phenol number 330. This overhead may with advantage be recharged to the operation during a subsequent run, preferably after the removal of the water and ketone and recovery of the capryl salicylate therefrom, and the unreacted capryl alcohol and methyl salicylate thus utilized.

The overall loss in the process was only 1.7% by weight and the finished capryl salicylate yield of 1097 grams, together with the 228 grams of capryl salicylate in the overhead from the steam distillation, made a total yield of 1325 grams, equal to 52.1% by weight of the original charge, which is equivalent to a conversion of 88.3% by weight of methyl salicylate charged.

In a similar operation, wherein the molar ratio of capryl alcohol to methyl salicylate was 2:1, the molar ratio of the sodium hydroxide added in methanol solution to methyl salicylate was .05:1, the average temperature was 330° F., with a final or maximum temperature of 369° F., and the reaction time was 6.5 hours, the yield of the methyl alcohol was 83.6% by weight of the theoretical yield and the yield of capryl salicylate was 84.6% by weight of the theoretical yield, the latter having an acid number of 0.8 and a saponification number of 220.3. In this run the sodium hydroxide was added as a 20% methanol solution over a 2 hour period.

A commercial sized operation, in accordance with our present invention, was carried out in a 1300 gallon horizontal gas-fired iron shell still fitted with an unpacked brass tower 10 inches in diameter and 6 feet in height. To this still there was charged 2210 pounds of methyl salicylate and 3760 pounds of capryl alcohol of the quality previously noted, the molar ratio of alcohol to ester being 1.82:1. After this mixture had reached a temperature of 317° F., and any moisture present expelled, 179 pounds of a solution of 29 pounds of sodium hydroxide in 150 pounds of methanol was added over a period of 30 minutes, the molar ratio of sodium hydroxide to ester being 0.05:1. Heating was continued and in about 4 hours a temperature of 375° F. was attained. The mixture was held at this temperature for an additional 3 hours until no further methanol distilled off.

The overhead product amounted to 210 gallons and consisted primarily of methanol, capryl alcohol and a small amount of water. The methanol and capryl alcohol were recovered by fractionation. The bottoms remaining in the still contained sodium capryl salicylate, capryl ketone, unreacted capryl alcohol, unreacted methyl salicylate and capryl salicylate and amounted to 590 gallons. From another run, under similar conditions, 220 gallons of overhead and 565 gallons of bottoms were obtained.

A 1055 gallon portion of the bottoms from these two runs was charged to a 1500 gallon glass-lined Pfaudler kettle fitted with a stirrer to provide agitation and the bottoms washed, first with 210 gallons of dilute sulfuric acid (10 gallons of 93% sulfuric acid in 200 gallons of water) and then with two successive 500 gallon portions of water. The yield of ester from this washing operation was 1045 gallons.

A 1000 gallon portion of the washed ester was then charged to the 1300 gallon horizontal still previously described and heated to 300° F. Steam was then introduced and the external heating continued until a liquid temperature of 370° F. was attained. The liquid was held at this temperature until all of the unreacted capryl alcohol and methyl salicylate had been distilled off. The total time required for this distillation was 7½ hours.

From this steam distillation there was obtained an overhead of 250 gallons of water and 2490 pounds of recycled alcohol. The latter contained capryl ketones, unreacted capryl alcohol and methyl salicylate and a small proportion of capryl salicylate and was used as part of the charge for succeeding runs.

The yield of capryl salicylate remaining in the still after the steam distillation was 4681 pounds, equivalent to a conversion of 73.7% by weight of the methyl salicylate charged to capryl salicylate. This capryl salicylate product has an acid number of 2.2 and a saponification number of 219.5, indicating a purity of 98% by weight and the presence of 0.5% by weight of salicylic acid.

The sodium hydroxide used in the foregoing specific examples was the commercial grade caustic soda of 76% Na₂O and the amounts used were on an anhydrous basis.

The optimum proportion of catalyst used depends somewhat upon operating conditions. Generally, ratios of from 0.025 to 0.2 mole of sodium hydroxide per mole of methyl salicylate have been found effective.

It is generally desirable to use a substantial excess of the capryl alcohol. In the foregoing specific examples approximately 1.85 mole per mole of methyl salicylate has been used. Good yields may be obtained using smaller excesses of the capryl alcohol, for example as low as 0.1 mole. However, it is usually preferable to use about 1.5 to 2 moles of capryl alcohol per mole of methyl salicylate. Since excess capryl alcohol may be substantially completely recovered for reuse, a substantial excess is generally recommended.

The temperature at which the process is carried out may likewise be varied somewhat. Generally, the rate of reaction and the yield are favorably affected where temperatures within the range of 275° F. to 375° F. are employed. It is essential that the temperature be substantially in excess of the boiling point of water, as previously stated, so as rapidly to expel from the zone of reaction any water formed. However, care must be exercised to avoid temperatures sufficiently high to cause dehydration of the capryl alcohol resulting in the conversion of the alcohol to olefins and the formation of water. Temperatures within the range of about 250 to 400° may be used with advantage and, if operating at reduced pressures, even lower temperatures may be employed.

In the foregoing specific examples, the pressure employed was substantially atmospheric. Subatmospheric pressures may be employed without departing from the spirit of this invention and may be found advantageous for the rapid removal of water and methyl alcohol where it is desired to lower the operating temperature.

In the foregoing description of our improved process, the sodium hydroxide has been designated a catalyst. While it cannot be stated with certainty that the sodium hydroxide functions as a true catalyst, it has been proven that, by its use in minor proportions, as herein described, the desired reaction is promoted and a highly effective process for the production of capryl salicylate results.

We claim:

1. In the process of preparing capryl salicylate by heating a substantially anhydrous mixture of capryl alcohol and methyl calicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of methyl salicylate and capryl alcohol to a temperature well above the boiling point of water, adding thereto a minor proportion of sodium hydroxide and maintaining the temperature of the mixture during the reaction well above the boiling point of water but below that at which substantial dehydration of the alcohol would occur.

2. In the process of preparing capryl salicylate by heating a substantially anhydrous mixture of capryl alcohol and methyl salicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of the methyl salicylate and capryl alcohol to a temperature well above the boiling point of water, adding thereto sodium hydroxide in alcoholic solution and maintaining the temperature of the mixture during the reaction well above the boiling point of water but below that at which substantial dehydration of the alcohol would occur.

3. In the process of preparing capryl salicylate by heating a substantially anhydrous mixture of capryl alcohol and methyl salicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of methyl salicylate and capryl alcohol to a temperature within the range of about 250 to 400° F., adding thereto a minor proportion of sodium hydroxide and maintaining the temperature of the mixture within the above-stated range during the reaction.

4. In the process of preparing capryl salicylate by heating a substantially anhydrous mixture of capryl alcohol and methyl salicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of methyl salicylate and capryl alcohol in which the molar ratio of the alcohol to the ester is in excess of unity to a temperature within the range of about 250 to 400° F., adding thereto a minor proportion of sodium hydroxide and maintaining the temperature of the mixture within the above-stated range during the reaction.

5. In the process of preparing capryl salicylate by heating a substantially anhydrous mixture of capryl alcohol and methyl salicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of capryl alcohol and methyl salicylate in which the ratio of the alcohol to the ester is in excess of unity to a temperature within the range of about 275 to 375° F., adding thereto sodium hydroxide in proportions such that the molar ratio of sodium hydroxide to methyl salicylate is within the range of about 0.025–0.2:1 and maintaining the temperature of the mixture within the above-stated range during the reaction.

6. In the process of preparing capryl salicylate by heating a substantially anhydrous mixture of capryl alcohol and methyl salicylate in the presence of a catalyst whereby the methyl radical of the ester is replaced by the octyl radical of the capryl alcohol and methyl alcohol is liberated and expelled from the zone of reaction substantially as rapidly as formed, the improvement comprising heating a mixture of capryl alcohol and methyl salicylate in which the molar ratio of the alcohol to the ester is about 1.85:1 to a temperature within the range of about 275 to 375° F., adding thereto sodium hydroxide in alcoholic solution in proportions such that the molar ratio of sodium hydroxide to methyl salicylate is about 0.05:1 and maintaining the temperature of the mixture within the above-stated range during the reaction.

STEPHEN J. WAYO.
FRANKLIN M. WATKINS.